Dec. 17, 1968     N. DAVIS ET AL     3,416,328
METHOD AND APPARATUS FOR CONTROLLING THE OPERATION
OF AN ENVIRONMENTAL GROWTH CHAMBER
Filed April 4, 1967     2 Sheets-Sheet 1

INVENTORS.
NOEL DAVIS &
CARL E. MERCHANT
BY
*Meyer, Tilberry & Body*
ATTORNEYS

3,416,328
METHOD AND APPARATUS FOR CONTROLLING THE OPERATION OF AN ENVIRONMENTAL GROWTH CHAMBER
Noel Davis, Russell Township, and Carl E. Merchant, Mentor, Ohio, assignors to Integrated Development and Manufacturing Co., Chagrin Falls, Ohio, a corporation of Ohio
Filed Apr. 4, 1967, Ser. No. 628,479
8 Claims. (Cl. 62—118)

ABSTRACT OF THE DISCLOSURE

Apparatus for, and a method of, operating an environmental growth chamber having cooling coils through which coolant is circulated at a temperature below the freezing point of water, fans for continuously circulating air over the coil and through the chamber to maintain a desired temperature above freezing within the chamber, and a temperature sensor responsive to the temperature within the chamber for stopping flow of coolant whenever the temperature sensed is below the desired temperature and permitting flow of coolant whenever the temperature sensed is above the desired temperature. The method includes the step of limiting the maximum length of time which coolant can flow by periodically overriding, for brief periods, the temperature sensor's call for coolant flow; while the apparatus comprises a pair of timers arranged to practice the noted method.

---

This invention is directed to the art of environmental growth chambers and more particularly to an improved method and apparatus for controlling the operation of an environmental growth chamber.

The invention is particularly applicable for controlling the cooling coil of an environmental growth chamber of the cold chamber type, and will be described with particular reference thereto; however, it will be appreciated the invention is capable of broader application and could be used in any type of growth chamber having a cooling coil that is operated at a temperature below the freezing point of water to maintain an air temperature above freezing.

Environmental growth chambers are widely used for producing closely controlled conditions of temperature and humidity for conducting biological experiments. Generally, these growth chambers comprise a well insulated housing structure provided with apparatus to maintain a continuous flow of air through the housing and to control the temperature and humidity of the air to extremely close tolerances. When the growth chamber is of the type known as a "cold chamber" the temperature must be controllable to any point within a range of from approximately 32 to 45° F. For this reason this apparatus includes a cooling coil through which coolant is circulated at a temperature below the freezing point of water. A temperature sensor is provided to start and stop the flow of coolant in response to the temperature within the chamber. The air in the chamber is continuously circulated across the coil to cool the air and produce the required low temperature within the chamber.

Because the coil is at a temperature below the freezing point of water, the moisture in the air when it condenses out freezes on the outer surfaces of the coil. Normally, when the growth chamber is operating under its design conditions, this will present no problems since the cooler size is normally chosen so that the cooler does not have to run continuously for any substantial period of time to maintain the required low temperature within the chamber. Thus, during those times when the temperature sensor is not indicating a need for cooling, coolant flow is "off" and the air flow over the coil melts the "frost." However, should conditions other than design conditions arise, such as high temperatures ambient the chamber, frequent opening of the chamber door, or leaving the door ajar, the temperature sensor will be signaling for coolant flow continuously for a substantial period of time. Consequently, during this time the "frost" buildup will become substantial, and the normal "off" periods of coolant flow will not be of sufficient length to permit the buildup to be melted. As a result, the buildup remains and will be continuously increased with each succeeding non-design condition operation. Should this buildup become relatively large, the air flow space is substantially reduced. Additionally, even a non-substantial layer of ice on the coil materially reduces the coefficient of heat transfer between the air and the coil. These factors result in reduced efficiency of the cooling coil. Consequently, it becomes difficult to maintain the air temperature at the desired point.

Unlike a refrigerator or freezer, the temperature in a growth chamber must be maintained closely to a certain point and not merely within a certain relatively broad range. Consequently, the above described conditions, even if not producing major temperature changes or variations, are detrimental to the results of experiments being conducted within the chamber.

In the past, growth chambers were operated in a manner similar to conventional refrigerators, or freezers, in that it was the practice to merely shut off the flow of coolant to the coil whenever the operator noticed that the buildup was becoming prohibitive. The air passing over the coil would then melt the ice on the coil. Subsequently, coolant flow was resumed.

While the above-described procedure may be satisfactory for refrigerators, or freezers, certain problems are inherent when it is applied to a growth chamber. First, if the operator fails to notice that the ice buildup is becoming excessive, the buildup continues until air flow through the coil is completely blocked. This result in undesirable increases in the temperature in the growth chamber. Secondly, even if the operator is reasonably attentive to his job the "off" time of coolant flow required to permit a noticeable buildup of ice to be melted from the coil can be excessive. During this time the temperature within the growth chamber substantially increases, which increase can have an adverse effect on experiments being conducted in the chamber.

The present invention overcomes these problems and provides an improved method and apparatus for controlling the flow of coolant through the cooling coil in a manner which prevents undesirable icing up of the coil and eliminates objectionable variations of temperature within the growth chamber.

In accordance with one aspect of the present invention an improved method is provided for operating an environmental growth chamber of the general type described comprising limiting the maximum length of time which coolant can flow by periodically overriding, for brief periods, the temperature sensor's call for coolant flow.

In accordance with another aspect of the present invention, improved apparatus is provided for operating an environmental growth chamber of the general type described. This apparatus comprises timing means for periodically overriding the temperature sensor's call for coolant flow, to cause the coolant flow to be continuously cycled to the cooling coil.

By thus continuously cycling the flow of coolant to the cooling coil when cooling is needed in the environmental growth chamber, the ice, which is formed on the outer surface of the cooling coil when the coolant is flowing through it, is never permitted to build up to any appreciable extent. This permits the cooling coil to be continuously operated at its maximum efficiency and to maintain a uniform temperature within the growth chamber.

A primary object of the present invention is the provision of a method of operating an environmental growth chamber of the cold chamber type so that the chamber's cooling coil is continuously operated at its maximum efficiency.

An additional object of the present invention is the provision of an environmental growth chamber having control means capable of maintaining a uniform temperature within the chamber.

An additional object of the present invention is the provision of an environmental growth chamber which requires a minimum of operator supervision.

These and other objects and advantages will become apparent from the following description used to illustrate the preferred embodiment of the invention as read in connection with the accompanying drawings in which.

Figure 1:
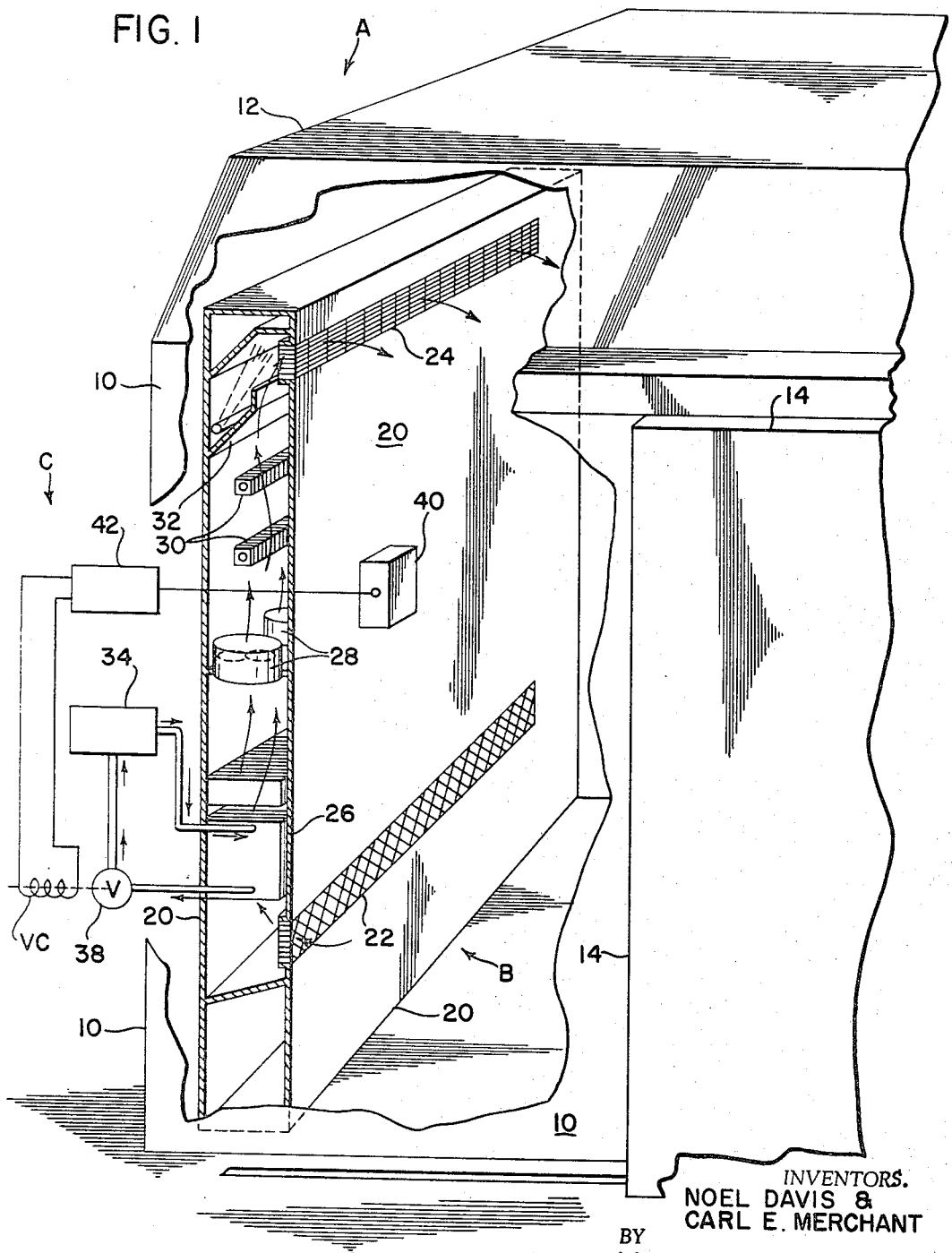
FIGURE 1 is a pictorial view of a growth chamber constructed according to the present invention and having a portion broken away to clearly show the interior temperature control apparatus.

Referring now to the drawings wherein the showings are for the purpose of illustrating the preferred embodiment of the invention only and not for the purpose of limiting same, FIGURE 1 shows the overall arrangement of the environmental growth chamber A and its associated temperature and humidity modifying devices B and the cooling coil regulating apparatus C.

The actual construction of the main growth chamber housing forms no part of the present invention; however, as shown in FIGURE 1, these growth chambers usually comprise well insulated side walls 10, a light cap 12, and an insulated access door 14. Light cap 12 supplies the necessary high intensity light needed for carrying out certain types of experiments within the chamber.

Means to modify the temperature and humidity of the air within the growth chamber are mounted on the interior side walls of the growth chamber or within a housing positioned in the interior of the growth chamber. The exact arrangement of these temperature humidity modifying devices forms no part of the present invention; however, as shown in FIGURE 1, these means generally include a cooler 26, circulating fans 28, heaters 30, and a humidifying device 32. These devices are separated from the interior of the chamber by a panel extending completely across the chamber, or by being mounted in a separate housing such as shown in FIGURE 1. FIGURE 1 shows a housing 20 provided with an air inlet 22 and an air outlet 24. Air from within the growth chamber is continuously drawn in through inlet 22 and blown out through outlet 24 by continuously operating fans 28.

The air passing through housing 20 is modified to the necessary temperature and humidity by the various devices within the housing. All of the devices, with the exception of cooler 26, are regulated by conventional temperature and humidity control equipment not shown.

In an environmental growth chamber of the "cold chamber" type, cooler 26 is of substantial size, and generally comprises a sinuously bent cooling coil covered with closely spaced heat exchange fins. The coil is provided with coolant at a temperature below the freezing point of water. This low coolant temperature is necessary in order to maintain the required low temperatures within the growth chamber without using an excessively large cooler, or circulating an extremely large quantity of coolant. As can readily be seen because the air is continuously circulated across the cooler 26, moisture from the air tends to condense out and freeze on the coil and heat exchange fins. As previously discussed, this reduces the efficiency of the cooler and, if permitted to go on long enough, results in blockage of air flow therethrough.

The present invention overcomes these problems and maintains the desired uniform low temperatures in the growth chamber by operating the cooler by a method which prevents any undesirable buildup of ice from forming on the cooling coil of the cooler.

This method, as do previous methods, comprises stopping the flow of coolant through the coil whenever the temperature within the growth chamber is at, or below, the desired temperature. However, as opposed to previous methods, the present method does not comprise continuously permitting the flow of coolant through the coil when there is a need for cooling in the growth chamber. Rather, when there is a need for cooling in the chamber the present method comprises continuously cycling the flow of coolant "on" and "off" for predetermined lengths of time. The lengths of these "on" and "off" periods are chosen so that during the "on" periods only a minimum of ice will be formed on the cooling coil. By thus limiting the "on" periods, a full flow of air is maintained through the coil. Consequently, short "off" periods are sufficient to permit the passage of air over the coil to melt off any ice which may have formed on the coil during the preceding "on" period. With the length of the "off" periods of relatively short duration, the temperature of the air in the growth chamber will not rise appreciably. Further, since only a minimum of ice is ever permitted to form on the coil, the coefficient of heat transfer is not adversely affected. In this manner, the cooling coil is continuously operated at its most efficient point, and the problems previously encountered eliminated.

The ideal length of time for the "on" and "off" periods will, of course, vary depending on various factors such as size of the cooling coil, the temperature of the coolant, the size of chamber, and the ambient operating conditions. However, in the growth chamber of the preferred embodiment, 20 minute "on" periods followed by 2 minute "off" periods produce excellent results.

Apparatus for accomplishing the above described method of constantly cycling the flow of coolant through the coil could take a variety of forms. However, according to the preferred embodiment the most satisfactory apparatus comprises a thermostatically controlled timing circuit which functions to energize and de-energize a coolant flow regulating valve at predetermined time intervals whenever there is a need for cooling within the growth chamber.

As shown in FIGURE 1, coolant is supplied to the coil of cooler 26 from a coolant source 34. Coolant source 34 could be any type of coolant supply apparatus capable of supplying a sufficient quantity of coolant at the necessary low temperature. The source 34 is provided with means (not shown) to maintain the required coolant flow through the coil and source. Also positioned on the discharge side of the cooling coil is a valve 38. This valve could be of many types, but in the preferred embodiment comprises a conventional solenoid valve of the normally closed (energized to open) type.

Figure 2:
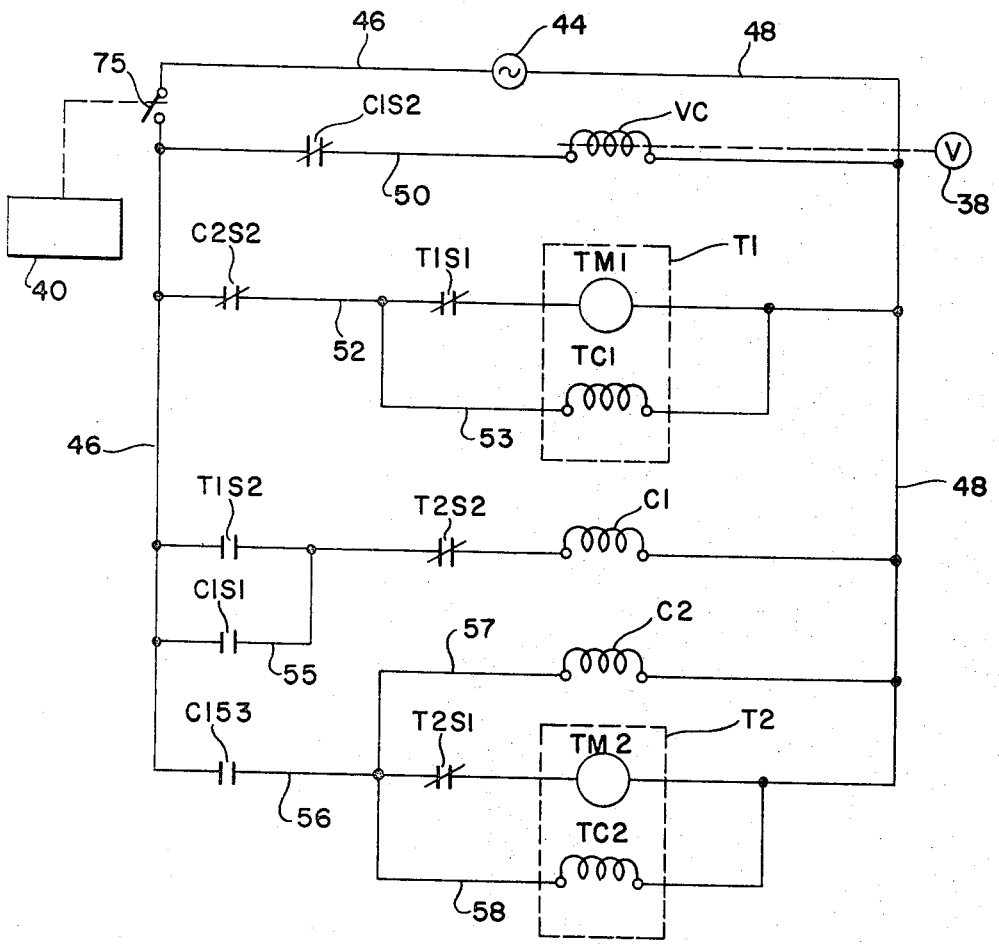
FIGURE 2 is a wiring diagram showing the electrical control apparatus of the present invention.

Valve 38 is controlled by a timing assembly 42 and thermostat 40. The particular timing control assembly used in the preferred embodiment of the present invention is shown in FIGURES 2. This assembly comprises a pair of timers T1 and T2 which alternately cause solenoid coil VC of valve 38 to be energized and deenergized during the period when thermostat 40 indicates a need for cooling. These timers are conventional, commercially available, timers adjustable throughout a specified time range, and include a motor connected through a coil energized clutch to a rotary switch-operating cam. The switch-operating cam (not shown) of timer T1 controls switches T1S1 and T1S2, while that of timer T2 (likewise not shown) controls switches T2S1 and T2S2. Also shown are two relay coils C1 and C2, which respectively control switches C1S1, C1S2, C1S3, and switch C2S2.

With the timers and relays connected to the power source 44 in the manner shown in FIGURE 2, the timing circuit functions in the following manner.

Assume that thermostat 40 is indicating a need for cooling and has closed switch TS. Solenoid coil VC of valve 38 is then energized from power source 44 through line 46, switch TS, normally closed switch C1S2, line 50, coil VC, and line 48, back to the power source, thus opening the valve and permitting coolant flow through the coil 26. Simultaneously, power is supplied from line 46 through normally closed switch C2S2, lines 52 and 53 to clutch coil TC1 of timer T1. Also, this supplies power through normally closed switch T1S1 to timer motor TM1. This energizes the timing motor TM1 and clutch coil TC1 to thereby drive the switch actuating cam.

After a certain set period of time, the timer T1 "times out" and the cam opens normally closed switch T1S1, stopping timing motor TM1, but maintaining cam position through timer clutch TC1 and closing normally open switch T1S2. Closing of switch T1S2 energizes relay coil C1 through line 54 and normally closed switch T2S2. Energization of relay coil C1 closes normally open switches C1S1 and C1S3 and opens switch C1S2. Closing of switch C1S1 completes a holding circuit for relay coil C1, while closing of switch C1S3 energizes motor TM2 and clutch coil TC2 of timer T2 causing it to function in the manner described above with regard to timer T1. Opening of switch C1S2 de-energizes solenoid coil VC of valve 38 allowing the valve to move to its closed position cutting off flow of coolant to the coil 26. Relay coil C2 is energized simultaneously with timer T2 and opens normally closed switch C2S2, thus completely shutting off power to timer T1 and clutch coil TC1 allowing timer T1 to reset to zero time. Timer T2 times for a specified period of time and then "times out," momentarily opening normally closed switches T2S2 and T2S1. Opening of switch T2S2 shuts off power to relay coil C1. This permits normally open switches C1S1 and C1S3 to open, and normally closed switch C1S2 to close, thereby re-energizing solenoid coil VC of valve 38 and re-establish flow of coolant to cooling coil 26. Opening of switch C1S3 interrupts flow of power to timer T2 and coil C2. With coil C2 de-energized, switch C2S2 recloses. This resets timer T1 which again times in the manner previously described.

The above cycle is continuously repeated as long as switch TS is closed, indicating a need for coolant in the environmental growth chamber; however, should thermostat 40 signify a lack of need for cooling, switch TS is opened by thermostat 40, thus de-energizing coil VC of valve 38 and stopping the flow of coolant to the cooling coil 26 and resetting TM1 to zero from whatever time it had accumulated since TS initially closed. However, when the thermostat indicates a need for cooling and closes switch TS, the above-described timed cycling of valve 38 will again take place.

As previously mentioned, the timer settings for timers T1 and T2 are adjusted such that the length of time which valve 38 is permitted to remain open is not sufficient to allow appreciable formation of ice on the coil. Further, the time which the valve is open is such that the ice which has formed on the coil can readily be melted off by the passage of air thereover. Since ice is not permitted to form to any substantial extent on the coil because of this alternate opening and closing of the coolant supply valve, the coil continuously operates at its most efficient point. Additionally, because the periods during which coolant flow is stopped are relatively short, the temperature within the growth chamber will not rise appreciably.

In one installation using the above-described method and apparatus, the flow of coolant was continuously cycled "on" for 20 minutes and then "off" for 2 minutes throughout the period a need for cooling was indicated by the temperature sensor. Continuous monitoring of the temperature within the growth chamber during this period showed that during the 2 minute "off" portions of the cycle the temperature rose by only approximately 2 degrees. This relatively minor temperature change constitutes a substantial improvement over the large temperature changes which take place during the time necessary to de-ice the cooler when the cooler is operated in the manner it was previous to the present invention.

The invention has been described in great detail sufficient to enable one skilled in the art of environmental growth chambers to duplicate the invention. Obviously, modifications and alterations of the preferred embodiment will occur to others upon a reading and understanding of this specification, and it is my intention to include all such modifications and alterations as part of my invention insofar as they come within the scope of the appended claims.

Having thus described our invention, we claim:

1. The method of defrosting the cooling coil of an environmental growth chamber without supplying heat to said chamber, said chamber having at least one cooling coil through which coolant is circulated at a temperature below the freezing point of water, fan means for continuously circulating air over the coil and through the chamber to maintain a desired temperature above freezing within the chamber, and temperature sensing means responsive to the temperature within the chamber for stopping flow of coolant whenever the temperature sensed is below said desired temperature and permitting flow of coolant whenever the temperature sensed is above said desired tempertaure, said method comprising: limiting the maximum length of time which coolant can flow by periodically overriding, for brief periods, the temperature sensing means call for coolant flow, while continuing to operate said fan means to maintain a flow of air over said coil and through said chamber, whereby said coil is defrosted by flow of chamber air thereover.

2. In an environmental growth chamber having means to maintain the air therein at desired levels of temperature and humidity; including a coil having coolant circulated therethrough at a temperature below the freezing point of water, a continuously operating fan means for maintaining a continuous flow of air over the coil and through the chamber, a valve operable between a first closed position, and a second open position to control the flow of said coolant through said coil, and a thermostat means for controlling the air temperature within said chamber to a point above freezing and responsive to the temperature of said air being circulated through said chamber and movable between a first position indicating an absence of a need for cooling and a second position indicating a need for cooling; and electrical means interconnecting said thermostat and said valve for causing said valve to move to its first position when the thermostat means is in its first position and to move to its second position when said thermostat means is in said second position, the improvement comprising: timing means independent of said fan means for overriding said electrical means without stopping said fan means for causing said valve to move from its second to its first position when said thermostat means is in said second position, whereby said flow of coolant through said coil is stopped without stopping said fan means.

3. The improvement as defined in claim 2 wherein said timing means includes a first timer and a second timer.

4. The improvement as defined in claim 2 wherein said electrical means further includes a solenoid coil for operating said valve and a source of electrical power connected to said solenoid coil; and wherein said means for causing said valve to be maintained in said first position when said thermostat is in said first position includes a first switch operable by said thermostat for disconnecting said source of power from said solenoid coil.

5. The improvement as defined in claim 2 wherein said timing means includes a second switch connected in series with said first switch and said solenoid coil.

6. The improvement as defined in claim 5 wherein said timing means further includes means to operate said second switch to connect and disconnect said source of power to said solenoid.

7. The improvement as defined in claim 5 wherein said timing means further includes a coil connected in parallel with said solenoid coil for operating said second switch.

8. The improvement as defined in claim 5 wherein said timing means includes means for opening and closing said second switch when said first switch is closed.

References Cited

UNITED STATES PATENTS

| 2,621,487 | 12/1952 | Warren | 62—158 |
|---|---|---|---|
| 3,009,331 | 11/1961 | Hewett et al. | 62—203 X |
| 3,135,316 | 6/1964 | Foster et al. | 165—17 X |

LLOYD L. KING, *Primary Examiner.*

U.S. Cl. X.R.

62—158, 203